Dec. 15, 1953  G. R. LONG  2,662,273
METHOD OF MAKING HEAT EXCHANGE STRUCTURES
Filed March 24, 1950  2 Sheets-Sheet 1
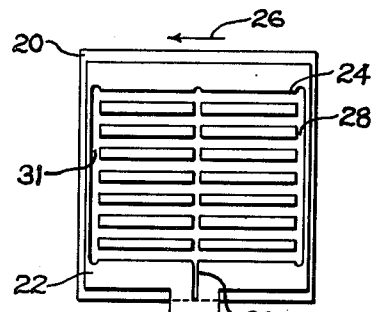
Fig. 1
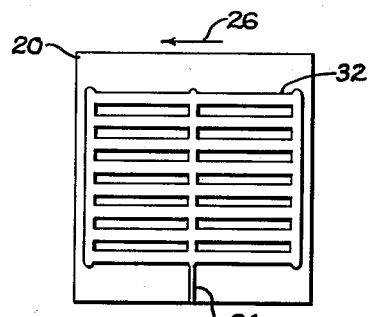
Fig. 2
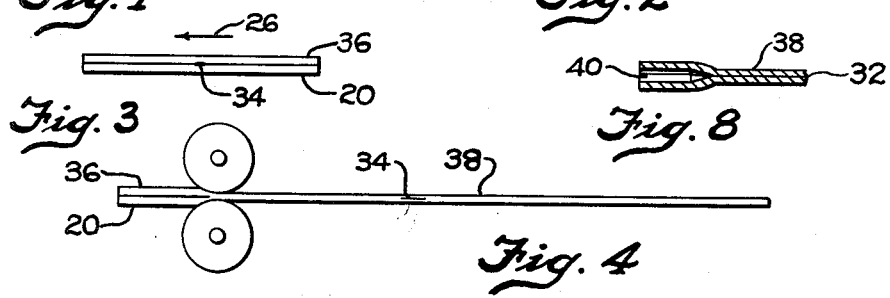
Fig. 3
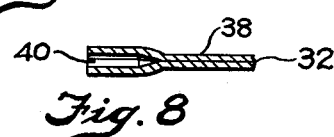
Fig. 8
Fig. 4
Fig. 5
Fig. 6
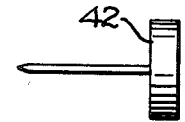
Fig. 7
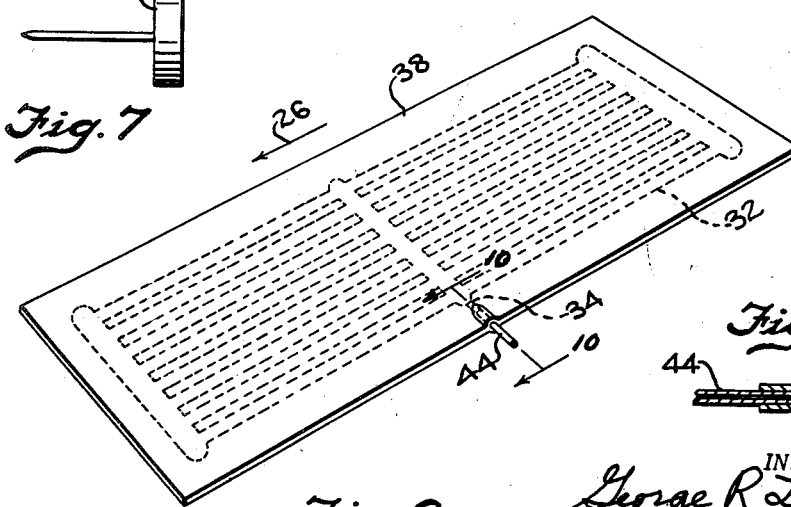
Fig. 9
Fig. 10
INVENTOR.
George R Long
BY
Willits Hardman and Fehr
attorneys Dec. 15, 1953          G. R. LONG          2,662,273
METHOD OF MAKING HEAT EXCHANGE STRUCTURES
Filed March 24, 1950                    2 Sheets-Sheet 2

INVENTOR.
George R. Long
BY
Willits, Hardman and Fehr
attorneys

Patented Dec. 15, 1953

2,662,273

UNITED STATES PATENT OFFICE 2,662,273

METHOD OF MAKING HEAT EXCHANGE STRUCTURES

George R. Long, Oakwood, Ohio, assignor to General Motors Corporation, Dayton, Ohio, a corporation of Delaware Application March 24, 1950, Serial No. 151,591

2 Claims. (Cl. 29—157.3)

This invention is related in a general way to refrigerating apparatus and more particularly to sheet metal heat exchange units and containers, and to a method of and apparatus for making heat exchange units and containers.

My invention is particularly intended to follow a process wherein to one surface of a sheet of weldable metal there is applied, in a definite pattern, a stopweld material which over the exact area of the pattern will prevent the welding of that one surface of the sheet to the surface of a second weldable sheet in contact with it. Following this, the two weldable sheets are forge-welded at all other areas of contact except the areas contacted by the pattern by hot-rolling the contact sheets to a reduction of at least about 40% for copper and copper base alloys and preferably more in a single pass to form a single sheet. The single sheet thus formed may be further hot-rolled and/or cold-rolled to the desired length or to the desired thickness. Preferably annealing follows.

According to my invention the single sheet thus formed is then placed between opposite parallel flat surfaces spaced apart a distance equal to the total thickness of the conduits to be formed within the sheet to provide the heat exchange unit or container. While a sheet is so positioned between the flat surfaces a fluid under pressure is applied to the areas contacted by the stop-weld pattern until they are expanded firmly into contact with the parallel flat surfaces to form passages having flat top and bottom walls in the desired pattern.

It is an object of my invention to provide a method of and apparatus for controlling the expansion of such passages without requiring a die having a surface complementary of the exact configuration desired.

It is another object of my invention to provide a method of controlling expansion of sheet metal structure during inflation which will readily accommodate potential passages of various patterns.

It is another object of my invention to form a sheet metal heat exchange unit in such a way that the walls of the passages are flat at the top and the bottom and the passages extend and are open to full width of the non-bonded portions of the sheet.

Further objects and advantages will be apparent from the following description, reference being had to the accompanying drawings, wherein a preferred form of the present invention is clearly shown.

In the drawings:

Fig. 1 is a plan view of a weldable sheet with a stencil laid in proper position thereon;

Fig. 2 is a similar view of the weldable sheet after a stop-weld material has been applied and the stencil removed;

Fig. 3 is an edge view of the sheet shown in Figs. 1 and 2 with a second similar sheet laid thereon;

Fig. 4 is an edge view illustrating the forge-welding of the two sheets shown in Fig. 3 into one sheet by hot-rolling;

Fig. 5 is an illustration of the sheet shown in Fig. 4 at the completion of the rolling and annealing;

Fig. 6 is an edge view of the sheet shown in Fig. 5 after a passage leading to the edge has been opened by the tool illustrated in Fig. 7;

Fig. 8 is a sectional view taken along the line 8—8 of Fig. 6;

Fig. 9 is a perspective view of the sheet completed as shown in Fig. 6, together with a connecting tube connected to the portion opened by the tool shown in Fig. 7;

Fig. 10 is a sectional view taken along the lines 10—10 of Fig. 9;

Figure 11:
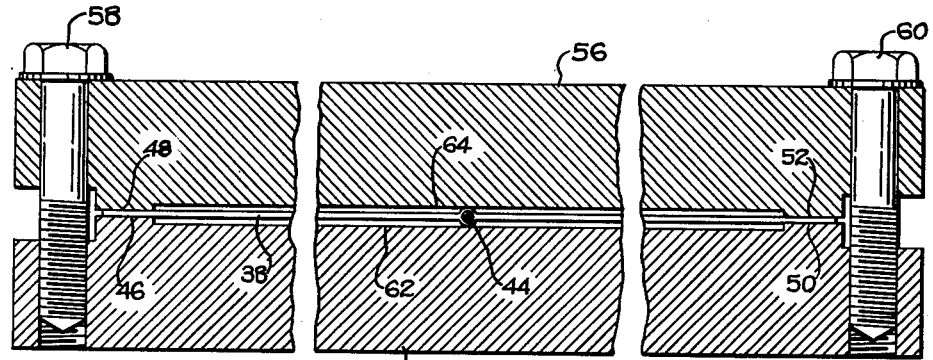
Fig. 11 is a view in elevation showing in an edge view the sheet in the form shown in Fig. 9 located between parallel flat surfaces in a fixture.

In this specific example there are used weldable bronze sheets each .070" thick of the following specification:

Copper, 92–94%
Iron, 2.10–2.60%
Zinc substantially all the remainder
Iron/zinc, minimum, .30
Tensile strength, 44,000 lbs. per square inch, minimum
Elongation in 2", 31% minimum
Hardness, Rockwell H, 96–103

The sheets are cut to approximately the same width as the width of the final product desired.

However, the sheets are cut slightly more than one-third the length of the final product desired. To one sheet 20 there is applied a stencil 22 having open portions in the configuration shown in Fig. 1 including an open portion extending to one edge of the sheet. The open portions 24 in the stencil 22 extending in the direction of rolling action as indicated by the arrow 26 are approximately the same width as the width of the passages extending in the direction of rolling in the final product. The opening portions 28, 30, and 31 in the stencil 22 which extend transversely to the direction of rolling are slightly more than one-third the width of the corresponding passages in the final product.

There is applied through the opening space in the stencil to the copper sheet 20 a stop-weld material. This stop-weld material may be applied by printing, rolling, painting or spraying the stop-weld material in fluid or solid form over the stencil 22 so that the stop-weld material is applied to all portions of the copper sheet within the open spaces of the stencil 22. In this example, the stop-weld material is in the form of a water suspension of colloidal graphite and sodium silicate which serves as a binder. The stop-weld material is partially dried and the stencil is removed leaving on the copper sheet 20 a grid-shaped pattern 32 formed of stop-weld material adhering directly to the surface of the sheet 20 in a configuration compressed to nearly one-third in the direction of rolling but otherwise like the configuration of passages desired in the final product. It will be seen that the grid-shaped pattern includes a single branch 34 leading to the lower edge of the sheet 20. Thereafter, a second similar sheet 36 is placed upon the surface of the sheet 20 to which the stop-weld material has been applied as shown in Fig. 2.

After this the two sheets 36 and 20 are forge-welded together. This forge-welding is accomplished by hot-rolling the two sheets together at a sufficient temperature for hot working, for example 950° C., and with at least a 55% to 60% reduction in a single pass to forge-weld two sheets into a single sheet 38, except over the entire area of the pattern 32 of stop-weld material illustrated in Fig. 2. This pattern 32 of stop-weld material illustrated in Fig. 2 elongates in the rolling process to the same extent of the elongation of the sheets as they are forge-welded into one by the rolling process. Several cold-rolling passes follow the initial hot-rolling pass to bring the sheet 38 to approximately the desired length. The final length in this example is about 2.92 times the original length. The thickness of the single sheet 38 is allowed to vary between .045" and .048". The sheet 38 is then annealed. The cold-rolling and the annealing causes the line of separation between the two sheets to disappear and recrystallization and grain growth extends across the former line of separation, so that the two sheets have been completely forge-welded into one, except where the stop-weld material has been provided.

A pointed tool 42 such as is shown in Fig. 7 is then applied to the line upon the edge of the sheet where there appears stop-weld material 34. This provides a tubular entrance 40 at the edge of the sheet 38 connecting directly with the non-bonded portions of the sheet 38 containing the stop-weld material 32.

As shown in Figure 9 the width of the stop-weld configurations extending in the direction of rolling is of the same width as in Figure 2, but the configurations extending transversely to the direction of rolling are slightly less than three times the width of those shown in Figure 2. A tube 44 is forced into the opening 40.

The problem of providing the passages within the sheet 38 was a formidable one. Experimentation showed that the non-bonded areas of different widths provided by the pattern of stop-weld material could not be freely expanded to a reasonable volume without rupturing and without distorting the sheet. Furthermore, non-uniform height of expansion is encountered where two convolutions join or cross one another. Another disadvantage in free expansion is that convolutions of varying widths expand at different rates and to varying heights. It was also found that rupturing took place when those areas were expanded while the sheet was held between dies having surface configurations complementary to the walls of the passages desired in the sheet. It seems that the rolling process produces slight inaccuracies in the location of the pattern of the stop-weld material in the sheet. Rubber dies were tried, but they proved unsatisfactory.

According to my invention, the walls forming the passages are confined in only one plane which is generally parallel to the plane of the sheet material. Otherwise the walls of the passages are free to expand laterally. This lateral expansion is only limited by the holding power of the united portions of the sheet at the edges of the passages. This makes a very favorable structural situation since the separating forces are limited because the flat surfaces absorb and support the force of the pressure in proportion to the area of contact. The presence of the flat surfaces limits the forces upon the wall portions and the united portions so that rupturing is avoided. In this specific example, the sheet 38 is then placed within a fixture as shown in Fig. 11 with the edges of the sheet 38 clamped between the opposed parallel flat portions 46, 48, 50, and 52 of the lower portion 54 and the upper portion 56 of the fixture. The long screws 58 and 60 are used to apply the clamping action.

The portion of the upper and lower portions 54 and 56 between the clamping projections 46, 48, 50, and 52 is provided with opposed parallel flat surfaces 62 and 64 which are spaced apart the exact distance equal to the total thickness desired for this portion of the heat exchange unit. In this specific example, these portions are undercut relative to the surfaces 46 and 48, an amount equal to $\frac{3}{64}$". The total distance between the surfaces 62 and 64 is then $\frac{3}{32}$" plus the thickness of the sheet 38 which will vary between about 0.45" and 0.48". It will be understood that under the conditions of forge welding by rolling that the places where the stop-weld material is provided will not be exactly in the same place on every set of sheets which are welded. My invention prevents such inaccuracies and variations from being a problem. To expand the places provided with the stop-weld material, I apply through the tube 44 water or other convenient fluid at a pressure up to 10,000 lbs. per square inch or higher. When forming sheet metal structures having $\frac{3}{8}$ inch wide passages using the materials and method disclosed in this application it was found that a minimum pressure of at least 1500 pounds per square inch was necessary to separate the nonbonded portions of all of the passages far enough for the outer walls to move into contact with the dies spaced .144 inch apart. That even at a pressure of 3000 pounds per square inch only the crest of the passages was in contact with the die and that a pressure of 6000 pounds per square inch was required to dilate the passages enough to start appreciably flattening the outer surface of the passages and that over 7000 pounds pressure was required to complete the forming of the passages so as to obtain the general shape shown in Figures 14 and 15 of the drawing. This water under hydraulic pressure expands the two wall portions on either side of the stop weld material firmly into contact with the surfaces 62 and 64 as shown in Figure 11.

Figures 14, 16:
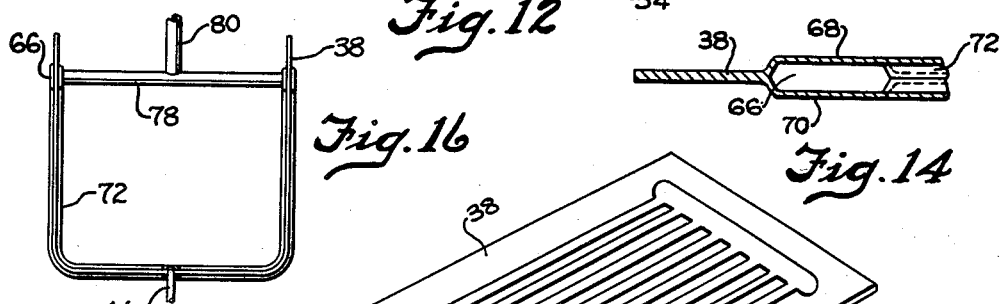
Fig. 14 is a sectional view taken along the line 14—14 of Fig. 13.
Fig. 16 shows a sheet metal structure after it has been bent into a U-shape and provided with refrigerant outlet connections.
Figures 13, 15:
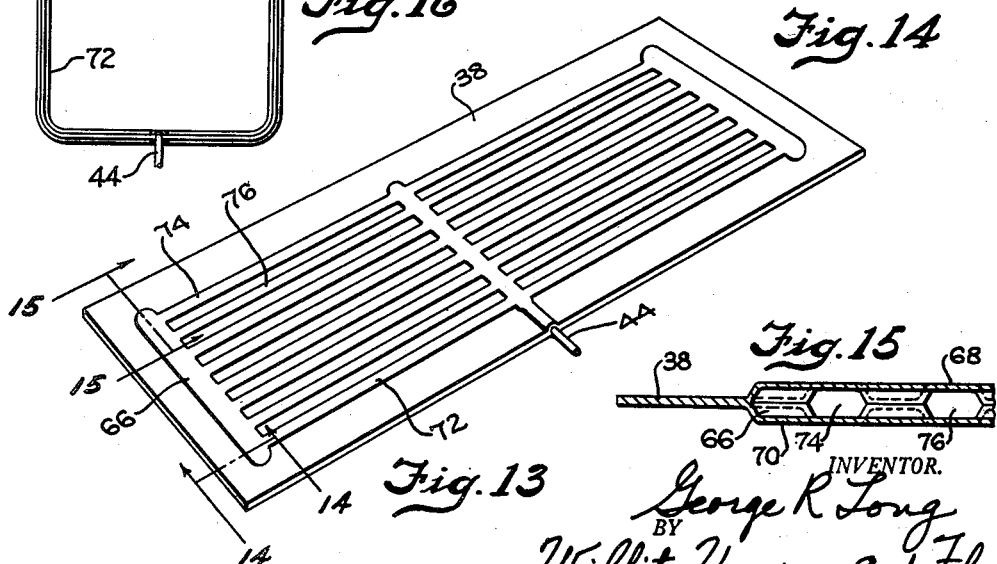
Fig. 13 is a perspective view of the sheet metal structure after it has been removed from the fixture as shown in Fig. 12.
Fig. 15 is a sectional view taken along the line 15—15 of Fig. 13.

After this expansion takes place, the sheet 38 is removed from the fixtures 54, 56. The sheet 38 is removed in a uniform straight condition having flat-topped passages formed therein with cross-sections of the shape illustrated in Figs. 14 and 15. For example, in Fig. 14 the transverse passage 66 has a long flat top 68 and a long flat bottom 70. This passage 66 connects with the flat top transverse passages such as the flat top transverse passage 72. The flat top transverse passages better illustrated in Fig. 15 are located quite close together as illustrated by the passages 74 and 76, but between all of these passages there is an adequate thickness of completely united material which firmly prevents the upper and lower portions of the passages from rupture. These passages all have flat tops and bottoms providing excellent contact for ice trays and other vessels. The sheet 38 may be bent into the shape of a U as shown in Fig. 16 and the transverse end passages connected by a tube 78 which is shown connected to a suction conduit 80. The tube 44 which was used to apply the pressure to the sheet 38 may then serve as the refrigerant inlet or if desired the outlet of the heat exchange unit.

Figure 12:
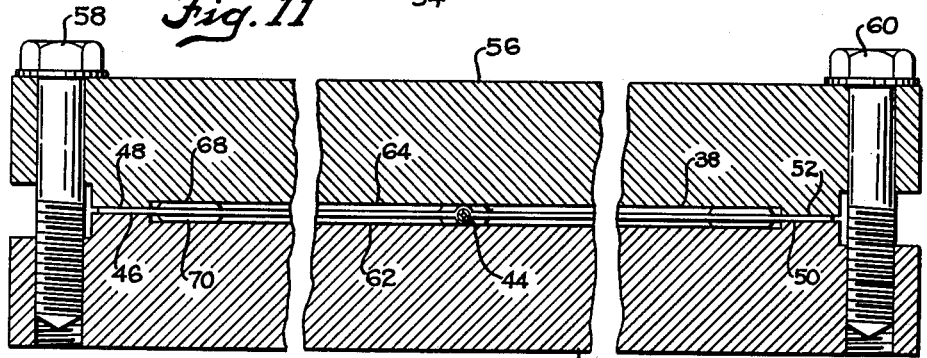
Fig. 12 is a view similar to Fig. 11 showing the sheet material after the portions provided with the stop-weld material illustrated in Fig. 2 have been expanded into contact with the flat surface.

Although one specific example has been given, it should be understood that other materials such as copper, copper base alloys, other bronzes, brasses, and aluminum may be used for this forge-welding process. Also, stainless and other steel sheets may be bonded into a single sheet similar to that shown in Fig. 9 by electric welding processes and the refrigerant configurations formed therein by expanding the separated sheet portions by hydraulic pressure in the fixture as shown in Figs. 11 and 12. Although in Figs. 11 and 12 I have shown the maximum thickness of the sheet metal heat exchange unit as being uniform throughout, the opposed parallel flat surfaces may be made different distances apart in various portions of the unit so as to provide different thicknesses in different portions of the unit. Other stop weld materials may be used such as powdered material silicone or aluminum paint. Also stop-weld materials in sheet form may be used and the use of a stencil made unnecessary. By using flat surfaces to limit the expansion, the rupturing of the passages is prevented, and inaccuracies in the relative location of the passages to the fixture are avoided.

While the form of embodiment of the invention as herein disclosed, constitutes a preferred form, it is to be understood that other forms might be adopted, as may come within the scope of the claims which follow.

What is claimed is as follows:

1. The process of forming passages in a two layer flat sheet metal structure having forge-welded united portions of comparatively large area surrounding and lying between narrow non-bonded double walled portions separated by stop weld material and providing a potential continuous passageway, which comprises forming an opening connecting with non-bonded portions, fastening a fluid connection to said opening, applying a very high fluid pressure to said opening through said fluid connection and, said pressure being sufficiently high to separate and move apart the nonbonded portions and sufficiently high to rupture the metal when unsupported, and preventing rupture of the structure by limiting the expansion and stretching of the metal by two rigid flat surfaces extending throughout the entire nonbonded areas and the bonded areas directly between the non-bonded areas of the structure, said flat surfaces being located on opposite sides and spaced from each face of the structure a distance equal to the deformation desired.

2. The process of forming a single sheet of metal having within its interior narrow communicating and branching passageways of predetermined configuration which consists in, super-imposing one upon the other two sheets of metal having therebetween and inwardly of their edges stop-weld material arranged in paths of the desired configuration of the passageways with at least one of the paths extending and being exposed to an edge of the sheets, forge-welding the two sheets into one by hot-rolling the two sheets to extend them in at least one direction while bonding the same together into a single sheet of much less thickness, applying a very high fluid pressure, said pressure being sufficiently high to separate and move apart the nonbonded portions and also sufficiently high to rupture the metal when unsupported to the interior of the spaces occupied by the stop-weld material to expand the passageways and preventing rupture of the metal by limiting the expansion and stretching of the metal by two rigid flat surfaces extending throughout the entire non-bonded areas and the bonded areas directly between the non-bonded areas of the structure, said surfaces being located on opposite sides and spaced from each face of the structure a distance equal to the expansion desired in the passageway.

GEORGE R. LONG.

References Cited in the file of this patent

UNITED STATES PATENTS

| Number | Name | Date |
|---|---|---|
| 1,709,865 | Muffly | Apr. 23, 1929 |
| 1,723,659 | Rosenqvist | Aug. 6, 1929 |
| 1,847,176 | Frame | Mar. 1, 1932 |
| 1,994,903 | Warrender | Mar. 19, 1935 |
| 2,212,481 | Sendzimir | Aug. 20, 1940 |
| 2,582,358 | Schoellerman | Jan. 15, 1952 |

FOREIGN PATENTS

| Number | Country | Date |
|---|---|---|
| 401,476 | Germany | Sept. 8, 1924 |
| 304,689 | Great Britain | Apr. 14, 1930 |